3,017,436
PREPARATION OF FLUORAL
Dallas E. Hamilton, Lake Jackson, Tex., assignor to The Dow Chemical Company, Midland, Mich., a corporation of Delaware
No Drawing. Filed Nov. 28, 1956, Ser. No. 624,758
3 Claims. (Cl. 260—601)

This invention relates to an economically-advantageous method for the preparation of fluoral and is more particularly concerned with a one-step method of preparing fluoral from chloral.

Prior art techniques for the preparation of fluoral have involved the reduction of trifluoro acetic acid or acid chloride, the reaction of $CF_3CN$ with lithium aluminum hydride or by the reduction of butylformamide. Apparently, the reason these rather complex methods of preparing fluoral were used is that, as stated by Haszeldine and Sharpe, "Fluorine and Its Compounds," Wiley & Sons, 1951, page 93, the replacement by fluorine of a halogen in alpha-chloro and bromo-aldehydes is not possible. Dittman and Wrightson in United States Patent 2,705,706 show the fluorination of chloral with hydrogen fluoride and mercuric oxide to prepare monochlorodifluoroacetaldehyde, but do not show the perfluorination of chloral to fluoral. Further, Simons, "Fluorine Chemistry," volume 2, page 371 lists line attempted methods for the preparation of fluoral which failed. None of the above successful methods have proved to be commercially feasible and are only of academic interest.

It is, therefore, a principal object of the present invention to provide a commercially-feasible method for the synthesis of fluoral. Another object of the present invention is the preparation of fluoral from chloral using hydrogen fluoride as the fluorinating agent. Still another object of the present invention is to provide a method for the synthesis of fluoral by contacting chloral and hydrogen fluoride in the presence of cobalt, nickel or chromium catalysts impregnated on an active alumina. Other objects will become apparent hereinafter.

The process of the present invention includes the reaction of chloral with hydrogen fluoride at a temperature between 200 and 400 degrees centigrade and in the presence of a catalytic amount of cobalt, nickel or chromium suspended on active alumina. To more specifically describe the present invention the following example is given, but this example is not to be construed as limiting the invention thereto.

A mixture of 446 grams (3 moles) of chloral and 300 grams of hydrogen fluoride (15 moles) was passed through a catalyst bed of cobalt fluoride on active alumina (Alcoa F-10 activated alumina), prepared as described in U.S. Patent 2,744,147. The temperature was maintained at 330 degrees centigrade and the contact time was from 8-10 seconds. The reaction products were separated from the catalyst zone, led to a water condenser, an ice trap and a Dry-Ice trap. There was thus obtained 204 grams of fluoral or a yield of 70 mole percent of the theoretical. The hydrogen fluoride consumption was 92 percent of the theoretical. In addition to the fluoral separated, some partially fluorinated chloral (which can be recycled), and some dichlorodifluoromethane and monochlorotrifluoromethane were recovered.

While a temperature of 330 degrees centigrade was used in the above example, temperatures from 200-400 degrees centigrade are satisfactory. At temperatures below 200 degrees centigrade, the conversion is too small and above 400 degrees centigrade the chloral will crack. Apparently, pressure has little or no effect upon the reaction. Similarly, while 10 seconds was the contact time used in the above example, contact times from 2-20 seconds may be employed if desired. Contact times below 2 seconds result in small yields and contact times above 20 seconds result in a large amount of by-product formation. The ratio of reactants may be from 3-1 to 18-1 hydrogen fluoride to chloral, but a ratio of 5-1 is preferred.

U.S. Patent 2,744,147 teaches completely a method of preparing an activated catalyst suitable for use in the process of the present invention. This catalyst is a metal, either cobalt, nickel or chromium impregnated upon an active alumina support. Preparation of the catalyst is readily accomplished by mixing an aqueous solution of one or more halides of cobalt, nickel or chromium with the alumina, drying the alumina so-impregnated, and then activating by passing a stream of hydrogen fluoride over it. Any of the halides of the three metals aforesaid may be used in preparing the catalyst although generally the chlorides are used. Active aluminas which are suitable are reported by Stumpf et al., in Industrial and Engineering Chemistry, volume 42, page 1398-1403 (1950).

The particle size of the active alumina support should be such that at least part of the catalyst is fluidized by the stream of gases flowing into the reactor at the rate of flow for which the reactor is designed. It is usually preferred that the catalyst particles be from 40-200 mesh U.S. sieve series. If desired, an inert gas such as nitrogen can be passed through the reactor together with the reactants in order to increase the flow rate therethrough. The use of such inert gases also permits the employment of coarser catalyst particles. The dried impregnated alumina may be used per se, but it is preferred to activate this material by passing anhydrous hydrogen fluoride over it at elevated temperatures. This elevated temperature should not exceed the intended reaction temperature and is usually somewhat less.

After the fluorination reaction has been completed, the fluoral may be recovered by conventional methods such as distillation, extraction, or absorption in solvents.

The present invention describes for the first time a method of converting an alpha-chloro aldehyde with hydrogen fluoride into a fluorine containing aldehyde. It was unexpected that this reaction would occur in view of the experiences of Simons and the teaching of Haszeldine et al. This process is commercially feasible for the production of fluoral.

Various modifications may be made in the method of the present invention and it is to be understood that I limit myself only as defined in the appended claims.

I claim:
1. A process for preparing fluoral which comprises: passing through a reaction zone maintained between 200 and 400 degrees centigrade a 3:1 to 18:1 mole ratio mixture of hydrogen fluoride and chloral over a metallic catalyst selected from the group consisting of cobalt, nickel and chromium halides, said catalyst being impregnated on activated alumina, and, separating fluoral from the reaction zone effluent.

2. A process for preparing fluoral which comprises: passing through a reaction zone maintained at 330 degrees centigrade a 5:1 mole ratio mixture of hydrogen fluoride and chloral over a cobalt chloride catalyst impregnated on activated alumina, and, separating fluoral from the reaction zone effluent.

3. A process for preparing fluoral which comprises: providing a reaction zone containing a catalyst having a particle size between 40 and 200 mesh, said catalyst being selected from the group consisting of cobalt, nickel and chromium halides, said catalyst also being impregnated on activated alumina and having been activated by contacting anhydrous hydrogen fluoride therewith at a temperature below 200 degrees centigrade passing a 3:1 to 18:1 mole mixture of hydrogen fluoride and chloral through said reaction zone, and, separating fluoral therefrom.

References Cited in the file of this patent

UNITED STATES PATENTS

| | | |
|---|---|---|
| 2,705,706 | Dittman et al. | Apr. 5, 1955 |
| 2,744,147 | Milks | May 1, 1956 |